United States Patent
Do et al.

(10) Patent No.: US 12,459,564 B2
(45) Date of Patent: Nov. 4, 2025

(54) ELECTRONIC STEERING APPARATUS OF VEHICLE AND CONTROL METHOD THEREOF

(71) Applicant: HYUNDAI MOBIS CO., LTD., Seoul (KR)

(72) Inventors: Young Hwan Do, Yongin-si (KR); Hyung Ju Kwon, Yongin-si (KR); Woo Hyung Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 270 days.

(21) Appl. No.: 17/524,341

(22) Filed: Nov. 11, 2021

(65) Prior Publication Data

US 2023/0063764 A1    Mar. 2, 2023

(30) Foreign Application Priority Data

Aug. 31, 2021    (KR) .......................... 10-2021-0115376

(51) Int. Cl.
*B62D 5/04* (2006.01)
*B62D 6/00* (2006.01)
*B62D 6/10* (2006.01)

(52) U.S. Cl.
CPC ........... *B62D 6/008* (2013.01); *B62D 5/0481* (2013.01)

(58) Field of Classification Search
None
See application file for complete search history.

(56) References Cited

U.S. PATENT DOCUMENTS

| 2017/0101126 A1* | 4/2017 | Kim ..................... B62D 5/0493 |
| 2017/0183031 A1 | 6/2017 | Ko |
| 2018/0015945 A1 | 1/2018 | Kim |
| 2019/0276073 A1 | 9/2019 | Pramod et al. |
| 2019/0276074 A1* | 9/2019 | Tietz ..................... B62D 5/006 |
| 2020/0062304 A1 | 2/2020 | Park |
| 2020/0331515 A1 | 10/2020 | Moulaire et al. |
| 2020/0391789 A1 | 12/2020 | Kim |

(Continued)

FOREIGN PATENT DOCUMENTS

| DE | 10 2019 105 702 A1 | 9/2019 |
| DE | 10 2019 212 778 A1 | 2/2020 |
| DE | 11 2019 000 362 T5 | 10/2020 |

(Continued)

OTHER PUBLICATIONS

Korean Office Action issued on Apr. 26, 2023, in counterpart Korean Patent Application No. 10-2021-0115376 (4 pages in Korean).

(Continued)

*Primary Examiner* — Adam D Tissot
*Assistant Examiner* — Laura E Linhardt
(74) *Attorney, Agent, or Firm* — NSIP Law

(57) ABSTRACT

An electronic steering apparatus of a vehicle may include a reaction torque generator configured to generate command reaction torque based on a steering condition, and a reaction torque controller configured to receive a rack force and vehicle speed, to tune road sensitivity according to the vehicle speed, to set road sensitive torque by applying a gain according to a reaction sensitivity, to reflect the road sensitive torque into the command reaction torque to generate a final reaction torque, and to output the final reaction torque to a driving motor.

11 Claims, 5 Drawing Sheets

(56) References Cited

U.S. PATENT DOCUMENTS

2021/0371007 A1* 12/2021 Collier-Hallman .... B62D 6/002

FOREIGN PATENT DOCUMENTS

| | | | |
|---|---|---|---|
| DE | 10 2021 206 743 A1 | 12/2021 | |
| JP | 2015178286 A | * 10/2015 | |
| KR | 10-2017-0078405 A | 7/2017 | |
| KR | 10-2018-0007393 A | 1/2018 | |
| KR | 10-2020-0141728 A | 12/2020 | |

OTHER PUBLICATIONS

German Office Action issued on May 2, 2022, in the counterpart German Patent Application No. 1020211128983.1 (71 pages in German).

German Examination Report issued on Mar. 21, 2024, in counterpart German Patent Application No. 10 2021 128 983.1 (4 pages in German).

\* cited by examiner

ELECTRONIC STEERING APPARATUS OF VEHICLE AND CONTROL METHOD THEREOF

CROSS-REFERENCE TO RELATED APPLICATION

This application claims the benefit under 35 USC § 119(a) of Korean Patent Application No. 10-2021-0115376, filed on Aug. 31, 2021, the entire disclosure of which is incorporated herein by reference for all purposes.

BACKGROUND

1. FIELD

Exemplary embodiments of the present disclosure relate to an electronic steering apparatus of a vehicle and a control method thereof, and more particularly, to an electronic steering apparatus of a vehicle, which applies a band-pass filter to a rack force estimation value in an electronic steering apparatus based on an SBW (Steer-By-Wire) system, and provides a driver with reaction feeling based on road characteristics, and a control method thereof.

2. DISCUSSION OF RELATED ART

In general, a power steering system has been developed and applied as a steering apparatus of a vehicle, in order to improve the convenience of a driving operation by assisting a driver's operation force for a steering wheel. Such a power steering system is divided into a hydraulic power steering system using hydraulic pressure, an electric hydraulic power steering system using hydraulic pressure and an electromotive force of a motor at the same time, and an electric power steering system using only an electromotive force of a motor.

Recently, an SBW system has been developed and applied, which steers a vehicle by controlling a motor connected to a rack bar according to an electrical signal, without mechanical connectors such as a steering column or universal joint and a pinion shaft between a steering wheel and a wheel.

Such an SBW system may include the steering wheel for a steering operation of a driver, a reaction motor installed on one side of the steering wheel and configured to provide reaction torque based on the rotation of the steering wheel, a steering motor connected to the rack bar and configured to implement a steering operation, a plurality of sensors configured to sense a steering angle, vehicle speed and steering wheel torque, respectively, and an ECU (Electronic Control Unit) configured to drive the steering motor and the reaction motor according to an electrical signal inputted from each of the sensors.

Since the SBW system has no mechanical connections, the SBW system can reduce damage to a driver, caused by a mechanical part, in case of a vehicle collision. Furthermore, the decrease in number of mechanical connection parts can reduce the weight of the vehicle and unnecessary energy consumption during a steering operation, and the ideal steering performance can be accomplished by ECU programming. Thus, the use of the SBW system is gradually increasing.

The related art of the present disclosure is disclosed in Korean Patent Application Publication No. 10-2018-0007393 published on Jan. 23, 2018 and entitled "Apparatus for Controlling Steering in Steer-By-Wire System and Method thereof".

In such an electronic steering apparatus based on the SBW system, the reaction control and the steering control are performed by a wire with no mechanical connection parts, and the wheels of the vehicle are not physically connected to the steering wheel. Therefore, the electronic steering apparatus generates a reaction force based on a steering angular velocity and vehicle speed, and provides steering feel to a driver. However, the electronic steering apparatus has difficulties in controlling road reaction feel, undesired steering feel due to a mechanical connection may be transferred to the steering wheel held by a driver, and steering feel caused by tire self alignment or kick back may not be transferred to the steering wheel held by the driver. Thus, the electronic steering apparatus has difficulties in providing a reaction force desired by a driver in real time.

SUMMARY

Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided , an electronic steering apparatus of a vehicle including a reaction torque generator configured to generate command reaction torque based on a steering condition, and a reaction torque controller configured to receive a rack force and vehicle speed, to tune road sensitivity according to the vehicle speed, to set road sensitive torque by applying a gain according to a reaction sensitivity, to reflect the road sensitive torque into the command reaction torque to generate a final reaction torque, and to output the final reaction torque to a driving motor.

The reaction torque controller may include a sensitivity tuner configured to band-pass filter the rack force in order to tune the road sensitivity according to the vehicle speed, and a gain setter configured to set the gain based on the reaction sensitivity to the rack force filtered by the sensitivity tuner.

The sensitivity tuner may include a band-pass filter configured to band-pass filter the rack force with a center frequency and a bandwidth, a center frequency setter configured to set the center frequency of the band-pass filter according to the vehicle speed, and a bandwidth setter configured to set the bandwidth of the band-pass filter according to the vehicle speed.

The center frequency setter and the bandwidth setter may set the center frequency and the bandwidth based on corresponding tables.

The gain setter may include a vehicle speed gain setter configured to set a gain based on the vehicle speed.

The gain setter may include any one or any combination of a steering angular velocity gain setter configured to set a decoupling gain based on a steering angular velocity, and a column torque gain setter configured to set a decoupling gain based on a column torque.

The vehicle speed gain setter, the steering angular velocity gain setter and the column torque gain setter each may set the gain based on a corresponding table.

The steering condition may be based on a steering condition of a driver.

In another general aspect, there is provided a processor-implemented method of controlling an electronic steering apparatus of a vehicle, including generating, by a reaction torque generator, command reaction torque based on a steering condition, receiving, by a reaction torque controller, a rack force and vehicle speed, and tuning road sensitivity by filtering the rack force according to the vehicle speed, setting, by the reaction torque controller, road sensitive torque by applying a gain based on reaction sensitivity to the filtered rack force, and reflecting, by the reaction torque controller, the set road sensitive torque into the command reaction torque to generate a final reaction torque, and outputting the final reaction torque to a driving motor.

The tuning of the road sensitivity may include setting, by the reaction torque controller, a center frequency for band-pass filtering according to the vehicle speed, setting a bandwidth for band-pass filtering according to the vehicle speed, and band-pass filtering the rack force with the center frequency and the bandwidth.

The center frequency and the bandwidth may each be set through a corresponding table.

The setting of the road sensitive torque may include setting, by the reaction torque controller, the road sensitive torque by applying a gain based on the vehicle speed to the filtered rack force, on the basis of the reaction sensitivity.

The setting of the road sensitive torque may include setting the road sensitive torque by further applying a decoupling gain, based on any one or any combination of a steering angular velocity and column torque, to the filtered rack force, according to the reaction sensitivity.

Other features and aspects will be apparent from the following detailed description, the drawings, and the claims.

BRIEF DESCRIPTION OF THE DRAWINGS

Throughout the drawings and the detailed description, unless otherwise described or provided, the same drawing reference numerals will be understood to refer to the same elements, features, and structures.

Figure 1:
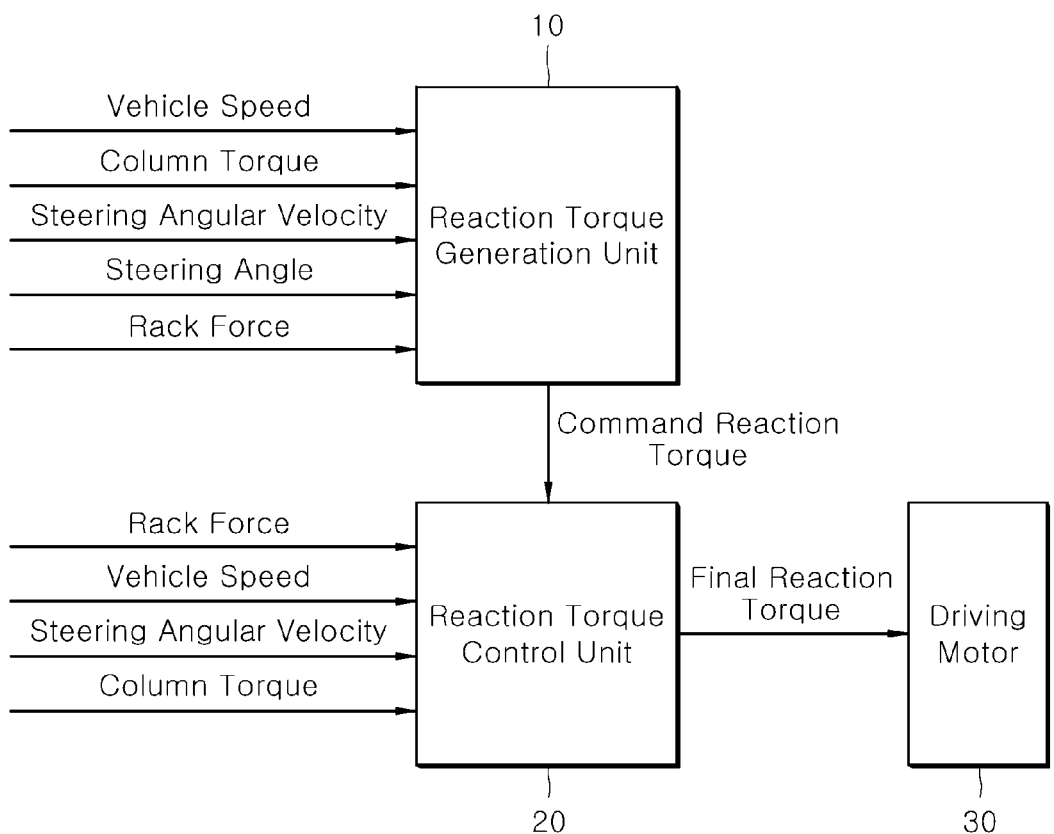
FIG. 1 is a block configuration diagram illustrating an electronic steering apparatus of a vehicle in accordance with an embodiment of the present disclosure.

The drawings may not be to scale, and the relative size, proportions, and depiction of elements in the drawings may be exaggerated for clarity, illustration, and convenience.

DETAILED DESCRIPTION OF THE ILLUSTRATED EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

As is traditional in the corresponding field, some exemplary embodiments may be illustrated in the drawings in terms of functional blocks, units, and/or modules. These block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an electronic steering apparatus of a vehicle and a control method thereof will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
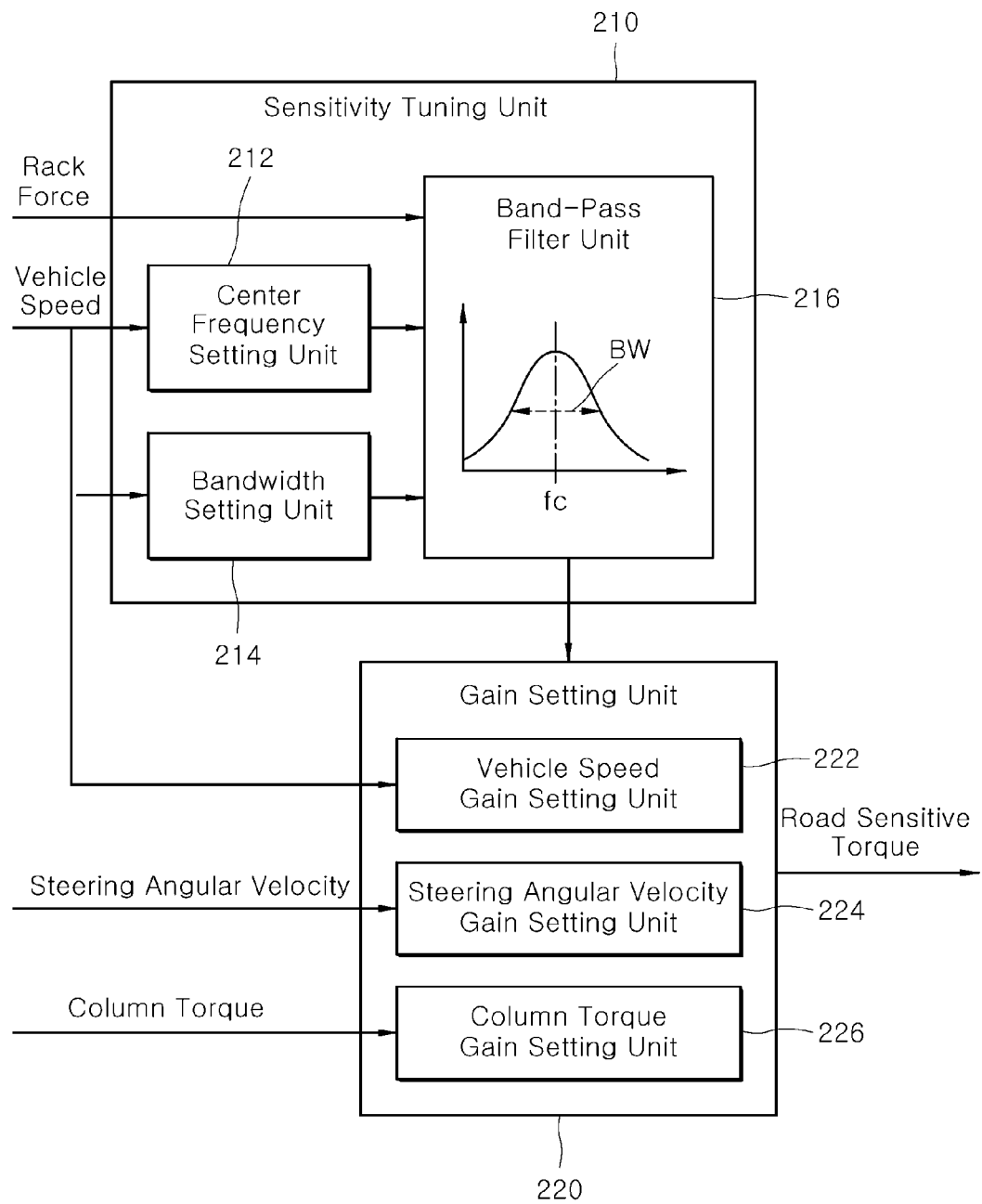
FIG. 2 is a configuration diagram illustrating a reaction torque control unit in the electronic steering apparatus of a vehicle in accordance with the embodiment of the present disclosure.
Figure 3:
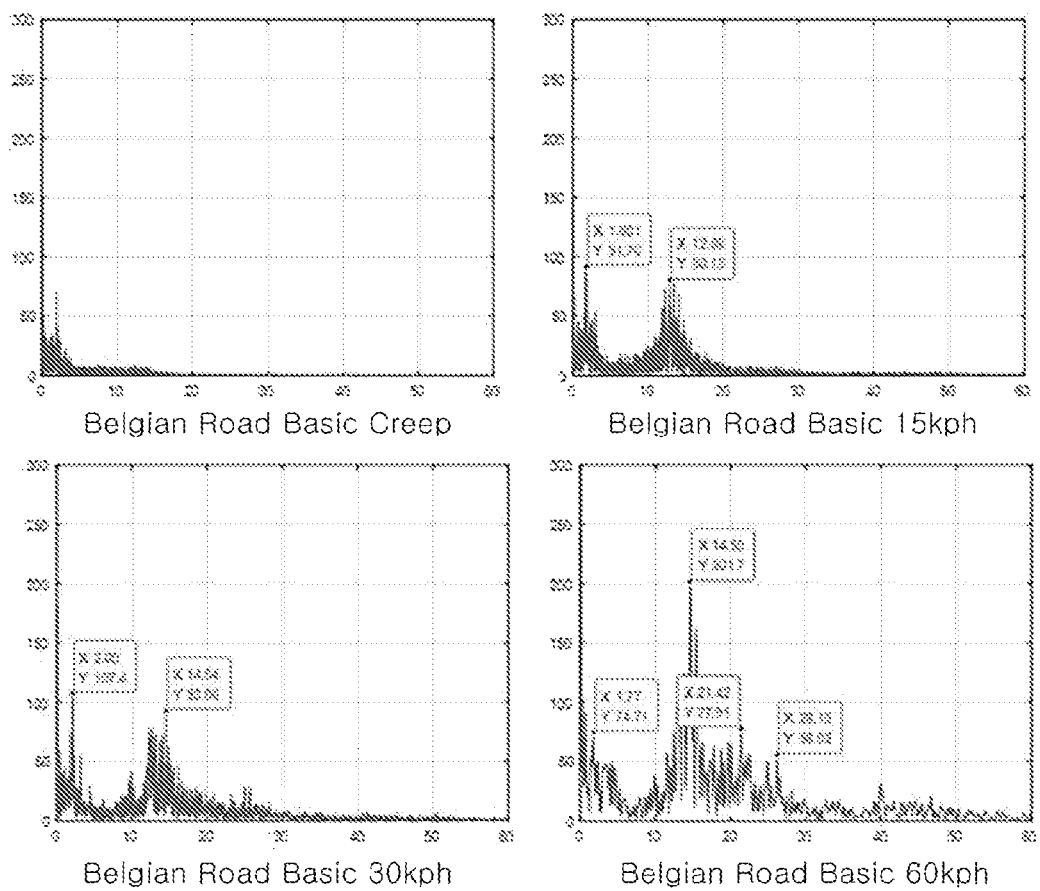
FIG. 3 is an FFT frequency analysis graph of a rack force based on speed in the electronic steering apparatus of a vehicle in accordance with the embodiment of the present disclosure.
Figure 4:
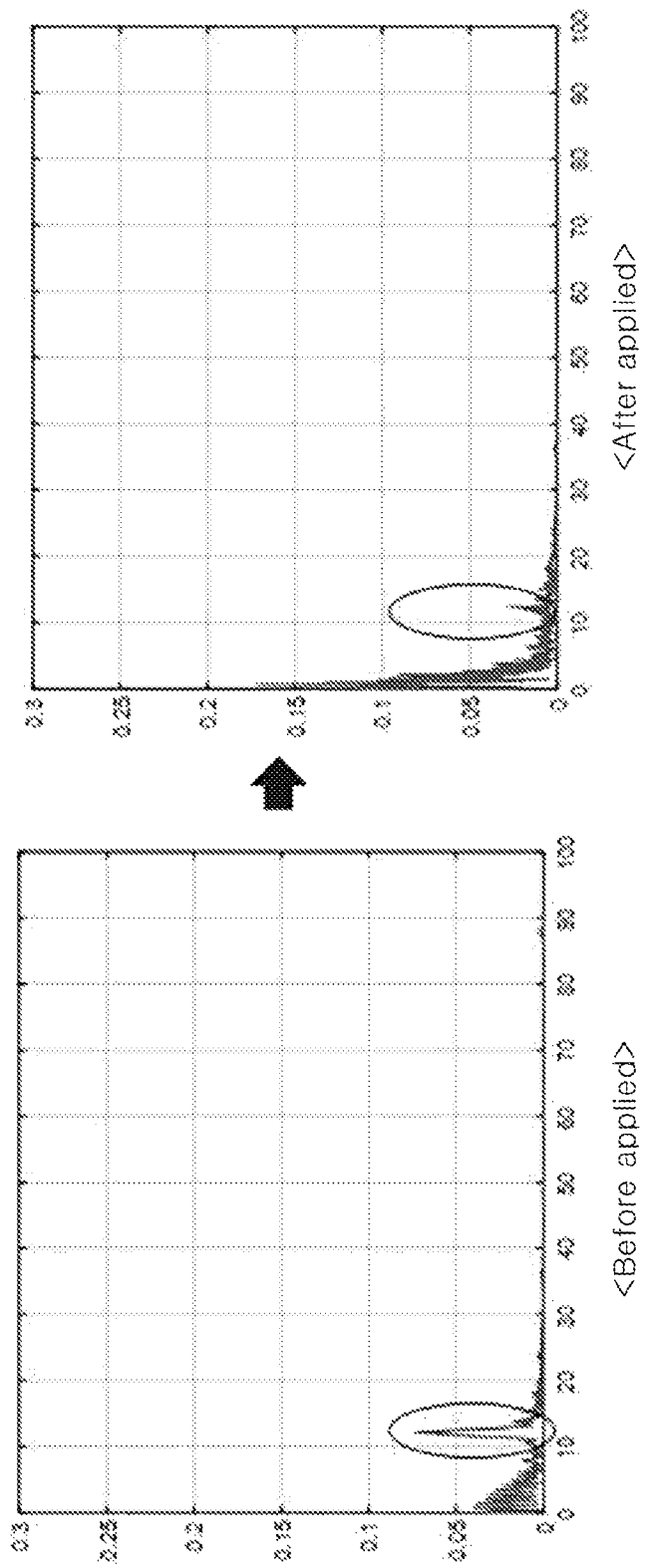
FIG. 4 is a reaction torque analysis graph showing the states of the electronic steering apparatus of a vehicle in accordance with the embodiment of the present disclosure, before and after road sensitive torque is applied.

FIG. 1 is a block configuration diagram illustrating an electronic steering apparatus of a vehicle in accordance with an embodiment of the present disclosure, FIG. 2 is a configuration diagram illustrating a reaction torque control unit in the electronic steering apparatus of a vehicle in accordance with the embodiment of the present disclosure, FIG. 3 is an FFT frequency analysis graph of a rack force based on speed in the electronic steering apparatus of a vehicle in accordance with the embodiment of the present disclosure, and FIG. 4 is a reaction torque analysis graph showing the states of the electronic steering apparatus of a vehicle in accordance with the embodiment of the present disclosure, before and after road sensitive torque is applied.

As illustrated in FIGS. 1 and 2, the electronic steering apparatus of a vehicle in accordance with the embodiment of the present disclosure may include a reaction torque generation unit 10 (may also be referred to as reaction torque generator) and a reaction torque control unit 20 (may also be referred to as reaction torque controller).

The electronic steering apparatus of a vehicle in accordance with the embodiment of the present disclosure is an electronic steering apparatus based on an SBW (Steer-By-Wire) system, which performs steering by driving a steering motor connected to a rack bar on the basis of a steering angle and vehicle speed, and drives a driving motor 30 to generate a reaction force to a steering wheel. In the present embodiment, the detailed descriptions of a steering control operation of controlling reaction torque by reflecting column torque caused by a steering mechanism and performing steering by driving a steering motor, when the steering mechanism is present, will be omitted herein.

The reaction torque generation unit 10 may generate command reaction torque based on the steering conditions of a driver, such as vehicle speed, column torque, steering angular velocity, steering angle, rack force and the like.

The reaction torque control unit 20 may receive the rack force and vehicle speed, tune road sensitivity according to the vehicle speed, set road sensitive torque by applying a gain according to reaction sensitivity, reflect the road sensitive torque into command reaction torque, and output final reaction torque to the driving motor 30.

As illustrated in FIG. 2, the reaction torque control unit 20 may include a sensitivity tuning unit 210 (may also be referred to as sensitivity tuner) and a gain setting unit 220 (may also be referred to as gain setter).

The sensitivity tuning unit 210 may band-pass filter the rack force in order to tune the road sensitivity according to the vehicle speed.

The sensitivity tuning unit 210 may include a band-pass filter unit 216, a center frequency setting unit 212 (may also be referred to as center frequency setter) and a bandwidth setting unit 214 (may also be referred to as bandwidth setter).

That is, the band-pass filter unit 216 band-pass filters the rack force with a preset center frequency fc and bandwidth BW.

The center frequency setting unit 212 may set the center frequency fc of the band-pass filter unit 216 according to the vehicle speed. At this time, the center frequency fc based on the vehicle speed may be configured as a table.

The bandwidth setting unit 214 may set the bandwidth of the band-pass filter unit 216 according to the vehicle speed. At this time, the bandwidth BW based on the vehicle speed may be configured as a table.

The center frequency and the bandwidth may be set by analyzing the vehicle speed and the rack force according to the type of a road.

For example, FIG. 3 is an FFT frequency analysis graph of the rack force based on the speed in the electronic steering apparatus of a vehicle in accordance with the embodiment of the present disclosure.

FIG. 3 is an FFT frequency analysis graph of a rack force based on speed on a Belgian road which is a test road, the Belgian road indicating an uneven road like a wagon road in Belgium.

As illustrated in FIG. 3, the frequency and magnitude at which the peak of the rack force occurs may differently appear depending on a low speed section and speed.

Therefore, the road sensitivity may be tuned by setting the center frequency and bandwidth according to the speed. Furthermore, the road sensitivity may be attenuated or increased according to the reaction sensitivity.

The gain setting unit 220 may attenuate or increase the road sensitive torque by setting a gain based on the reaction sensitivity to the rack force filtered by the sensitivity tuning unit 210.

The gain setting unit 220 may set a gain based on the vehicle speed, and additionally set a decoupling gain based on steering angular velocity and column torque.

That is, the gain setting unit 220 may further include any one or more of a steering angular velocity gain setting unit 224 (may also be referred to as steering angular velocity gain setter) and a column torque gain setting unit 226 (may also be referred to as column torque gain setter) as well as a vehicle speed gain setting unit 222 (may also be referred to as speed gain setter).

The vehicle speed gain setting unit 222 may attenuate or increase the road sensitive torque by setting the gain based on the vehicle speed.

For example, the vehicle speed gain setting unit 222 may attenuate or increase the road sensitive torque, in order to transfer the road characteristics as much as possible at low speed, but to make a driver insensitive to the road characteristics at high speed.

The steering angular velocity gain setting unit 224 may set a decoupling gain based on the steering angular velocity, such that a driver feels the road characteristics during low-speed steering, but becomes insensitive to the road characteristics during high-speed steering.

The column torque gain setting unit 226 may set a decoupling gain based on the column torque.

The vehicle speed gain setting unit 222, the steering angular velocity gain setting unit 224 and the column torque gain setting unit 226 may each set the optimal value through a test based on the corresponding table.

FIG. 4 is a reaction torque analysis graph showing the states of the electronic steering apparatus of a vehicle in accordance with the embodiment of the present disclosure, before and after the road sensitive torque is applied.

FIG. 4 shows a result obtained by tuning the road sensitivity in a region having a frequency of 10 to 15 Hz, actually measuring a road reaction force, and performing FFT analysis on the measured road reaction force. The result shows that the road vibration is attenuated.

As described above, the electronic steering apparatus of a vehicle in accordance with the embodiment of the present disclosure is an electronic steering apparatus based on the SBW system, and may tune the reaction sensitivity depending on the road by applying a band-pass filter, whose band is set according to the vehicle speed, to a rack force estimation value according to the vehicle speed, thereby providing a driver with reaction feel based on the road characteristics.

Figure 5:
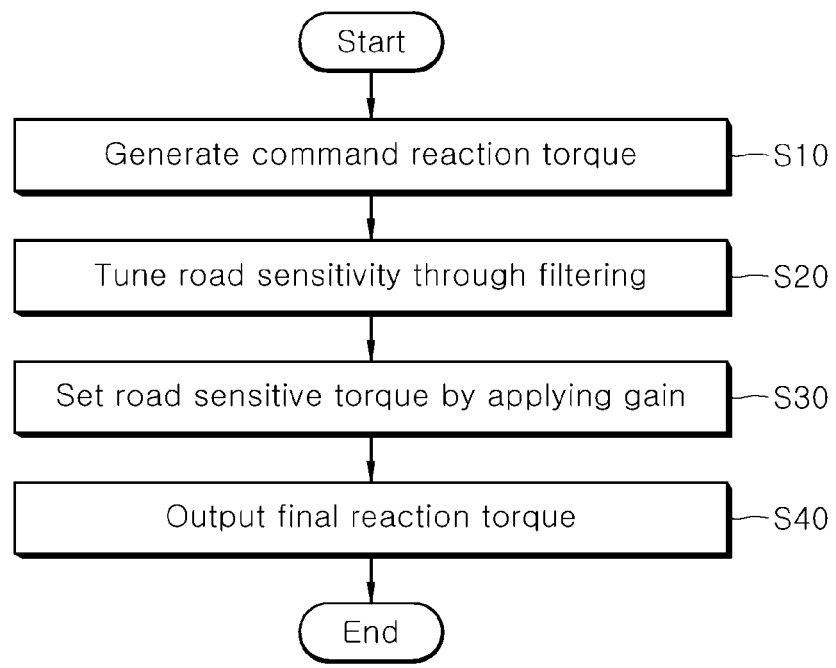
FIG. 5 is a flowchart for describing a control method of an electronic steering apparatus of a vehicle in accordance with an embodiment of the present disclosure.

FIG. 5 is a flowchart for describing a control method of an electronic steering apparatus of a vehicle in accordance with an embodiment of the present disclosure.

As illustrated in FIG. 5, the control method of the electronic steering apparatus of a vehicle in accordance with the embodiment of the present disclosure begins with step S10 in which the reaction torque generation unit 10 generates command reaction torque based on the steering conditions of a driver, such as vehicle speed, column torque, steering angular velocity, steering angle, and rack force.

After the reaction torque generation unit 10 generates the command reaction torque in step S10, the reaction torque control unit 20 receives a rack force and vehicle speed, and tunes road sensitivity by filtering the rack force according to the vehicle speed, in step S20.

The reaction torque control unit 20 may tune the road sensitivity by filtering the rack force through a band-pass filter whose center frequency fc and bandwidth BW are set according to the vehicle speed.

At this time, the center frequency fc and the bandwidth BW may be set by analyzing the vehicle speed and the rack force according to the type of the road, and the center frequencies and the bandwidths based on vehicle speeds may be configured as a table.

After tuning the road sensitivity by filtering the rack force in step S20, the reaction torque control unit 20 attenuates or increases the road sensitive torque by setting a gain based on reaction sensitivity to the filtered rack force, in step S30.

The setting of the gain based on the reaction sensitivity may include setting a gain based on the vehicle speed, and additionally setting a decoupling gain based on steering angular velocity and column torque.

For example, the reaction torque control unit 20 may attenuate or increase the road sensitive torque, in order to transfer the road characteristics as much as possible at low speed, but to make a driver insensitive to the road characteristics at high speed.

Furthermore, the reaction torque control unit 20 may set the decoupling gain based on the steering angular velocity, such that the driver feels the road characteristics during low-speed steering, but becomes insensitive to the road characteristics during high-speed steering, and may set the decoupling gain based on the column torque.

The optimal values of the gain based on the vehicle speed and the decoupling gain based on the steering angular velocity and the column torque may be each set through a test based on the corresponding table.

After setting the road sensitive torque in step S30, the reaction torque control unit 20 reflects the set road sensitive torque into the command reaction torque, and outputs final reaction torque to the driving motor 30, in step S40.

According to the control method of the electronic steering apparatus of a vehicle in accordance with the embodiment of the present disclosure, the electronic steering apparatus is an electronic steering apparatus based on the SBW system, and may tune the reaction sensitivity depending on the road by applying a band-pass filter, whose band is set according to the vehicle speed, to a rack force estimation value according to the vehicle speed, thereby providing a driver with reaction feel based on the road characteristics.

In accordance with an embodiment, disclosed are electronic steering apparatus of a vehicle, which tunes reaction sensitivity to the road by applying a band-pass filter, whose band is set according to vehicle speed, to a rack force estimation value in an electronic steering apparatus based on an SBW (Steer-By-Wire) system, and provides a driver with reaction feeling based on road characteristics, and a control method thereof.

In accordance with an embodiment, the electronic steering apparatus of a vehicle may be an electronic steering apparatus based on the SBW system, and the electronic steering apparatus and the control method may tune the reaction sensitivity depending on the road by applying a band-pass filter, whose band is set according to the vehicle speed, to a rack force estimation value according to the vehicle speed, thereby providing a driver with reaction feel based on the road characteristics.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device. The processor also includes a communication device, such as a computer, cellular phone, PDA (Personal Digital Assistant) and another device, which facilitates information communication between end users.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic steering apparatus of a vehicle, comprising:
   a reaction torque generator configured to generate command reaction torque based on a steering condition; and
   a reaction torque controller configured to;
   receive a rack force and vehicle speed, apply a band-pass filter to the rack force to extract road-induced force components, the band-pass filter having a center frequency and a bandwidth that are dynamically adjusted based on the vehicle speed using a predefined mapping;

generate road sensitive torque by applying a gain to the filtered rack force, the gain being selected based on at least one of vehicle speed, steering angular velocity, and column torque;

combine the road sensitive torque with the command reaction torque to produce a final reaction torque, and output the reaction torque to a reaction motor operatively coupled to a steering wheel wherein the filtering of rack force and gain application are performed independently of steering angle or wheel trajectory control, and are used exclusively to enhance road feel at the steering wheel.

2. The electronic steering apparatus of claim 1, wherein the band-pass filter is implemented as a digital filter with vehicle speed-dependent center frequency and bandwidth values stored in a lookup table.

3. The electronic steering apparatus of claim 1, wherein the gain applied to the filtered rack force is a composite gain including a vehicle speed gain, a steering angular velocity gain, and a column torque gain, each determined from respective lookup tables.

4. The electronic steering apparatus of claim 1, wherein the reaction torque controller is further configured to suppress frequency components of the rack force outside of the range associated with road texture frequencies, thereby minimizing noise artifacts in the reaction torque.

5. The electronic steering apparatus of claim 1, wherein the final reaction torque is updated at a fixed sampling rate synchronized with sensor acquisition and filtering intervals.

6. The electronic steering apparatus of claim 1, wherein the vehicle speed is obtained from a wheel speed sensor and is filtered using a low-pass filter before being used to adjust the center frequency and bandwidth of the band-pass filter.

7. The electronic steering apparatus of claim 1, wherein the gain applied to the filtered rack force is adjusted in real-time based on a dynamic driver preference profile stored in memory.

8. The electronic steering apparatus of claim 1, wherein the reaction torque controller includes a processor configured to execute a software routine for determining the center frequency and bandwidth of the band-pass filter based on a mathematical model of road-surface- induced rack force frequencies.

9. The electronic steering apparatus of claim 1, wherein the steering condition comprises at least one of steering wheel angle, driver torque input, or rate of change of steering angle.

10. The electronic steering apparatus of claim 1, wherein the filtered rack force and applied gain are updated continuously during vehicle motion to maintain consistent road feel feedback across varying road surfaces and speeds.

11. A processor-implemented method of controlling an electronic steering apparatus of a vehicle, comprising:

generating, by a reaction torque generator, command reaction torque based on a steering condition;

receiving, by a reaction torque controller, a rack force and vehicle speed;

dynamically adjusting a center frequency and a bandwidth of a band-pass filter based on the vehicle speed, using a predetermined mapping;

applying, by the reaction torque controller, the band-pass filter with the adjusted center frequency and bandwidth to the rack force signal to produce a filtered rack force; and calculating, by the reaction torque controller, a road sensitive torque by applying a gain to the filtered rack force, wherein the gain is determined based on at least one of the vehicle speed, a steering angular velocity, and a column torque; combining the road sensitive torque with the command reaction torque to generate a final reaction torque; and outputting the final reaction torque to a reaction configured to provide feedback torque to a steering wheel.

\* \* \* \* \*